(12) United States Patent
Komiya et al.

(10) Patent No.: US 8,668,243 B2
(45) Date of Patent: Mar. 11, 2014

(54) VEHICLE BOUNDARY LAYER AIR FLOW CONTROL STRUCTURE

(75) Inventors: Satoshi Komiya, Yokohama (JP); Kazuhito Sugimoto, Atsugi (JP); Hirofumi Kondou, Zama (JP); Yuichi Morinaka, Atsugi (JP); Tomohiro Koyahata, Yokosuka (JP); Masato Inoue, Kanagawa (JP); Kenichiro Koizumi, Tokyo (JP); Hitoshi Takagi, Fujisawa (JP); Yuji Ishihara, Zushi (JP); Kazuaki Nakajima, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/382,467

(22) PCT Filed: Jul. 13, 2010

(86) PCT No.: PCT/IB2010/001726
§ 371 (c)(1),
(2), (4) Date: Jan. 5, 2012

(87) PCT Pub. No.: WO2011/010199
PCT Pub. Date: Jan. 27, 2011

(65) Prior Publication Data
US 2012/0126574 A1    May 24, 2012

(30) Foreign Application Priority Data

Jul. 23, 2009  (JP) ................................. 2009-172328
Apr. 7, 2010  (JP) ................................. 2010-088844

(51) Int. Cl.
*B62D 35/00*    (2006.01)

(52) U.S. Cl.
USPC ........................ 296/180.1; 296/198; 296/1.11

(58) Field of Classification Search
USPC .............. 296/180.1, 198, 1.11; 362/487, 494, 362/496, 506, 507
See application file for complete search history.

(56) References Cited

U.S. PATENT DOCUMENTS 2,122,422 A * 7/1938 Huet ............................. 244/130
2008/0018134 A1 * 1/2008 Schreiber ................... 296/180.5

FOREIGN PATENT DOCUMENTS

JP    S60-163174    10/1985
JP    61-36036 A    2/1986

(Continued)

OTHER PUBLICATIONS

A Written Opinion of the International Search Authority for International Application No. PCT/IB2010/001726, dated Oct. 7, 2010, mailed Oct. 19, 2010.

(Continued)

*Primary Examiner* — Dennis Pedder
*Assistant Examiner* — Beverly Becker
(74) *Attorney, Agent, or Firm* — Global IP Counselors, LLP

(57) ABSTRACT

A vehicle boundary layer air flow control structure is provided with a vehicle body and a side view mirror. The vehicle body includes an exterior contoured surface with an air flow deflector. The side view mirror is attached to the vehicle body to provide a diagonally rearward direction to be viewed from a driver's seat. The air flow deflector has a downward air flow guiding surface provided in a vehicle body region of the exterior contoured surface of the vehicle body along which an air flow heading toward the side view mirror passes. The downward air flow guiding surface extends in an air flow direction of the air flow with respect to the side view mirror to divert the air flow underneath the side view mirror.

16 Claims, 15 Drawing Sheets

(56) References Cited

FOREIGN PATENT DOCUMENTS

| JP | S61-094484 | | 6/1986 |
|---|---|---|---|
| JP | 64-1073 | U | 1/1989 |
| JP | H06-312673 | | 11/1994 |
| JP | 2002-293188 | A | 10/2002 |
| JP | 2004-210138 | A | 7/2004 |
| JP | 3115345 | U | 9/2005 |
| KR | 20-1999-015725 | U | 5/1999 |
| SU | 1194733 | A | 11/1985 |

OTHER PUBLICATIONS

A Written Opinion of the International Preliminary Examining Authority for International Application No. PCT/IB2010/001726, mailed Jul. 5, 2011.

An English translation of the Chinese Written Notification of Opinion upon First Examination of corresponding Chinese Application No. 201080032767.2, issued on Mar. 27, 2013.

An English translation of the Japanese Office Action of corresponding Japanese Application No. JP2011-252188, dated Jan. 11, 2013, mailed Jan. 22, 2013.

An English translation of the Russian Decision on Grant of corresponding Russian Application No. 2012106668, issued on Jan. 30, 2013.

An English translation of the Korean Notice of Preliminary Rejection for the corresponding Korean Application No. 10-2012-7001759, issued on Apr. 17, 2013.

The Indonesian Office Action for the corresponding Indonesian patent application No. W-00201200281 issued on Aug. 21, 2013.

The Supplementary European Search Report for the corresponding European patent application No. 10802007.4-1757, issued on Jun. 17, 2013.

An English translation of the Chinese Written Notification of Opinion upon Second Examination for the corresponding Chinese Application No. 201080032767.2, issued on Oct. 15, 2013.

\* cited by examiner

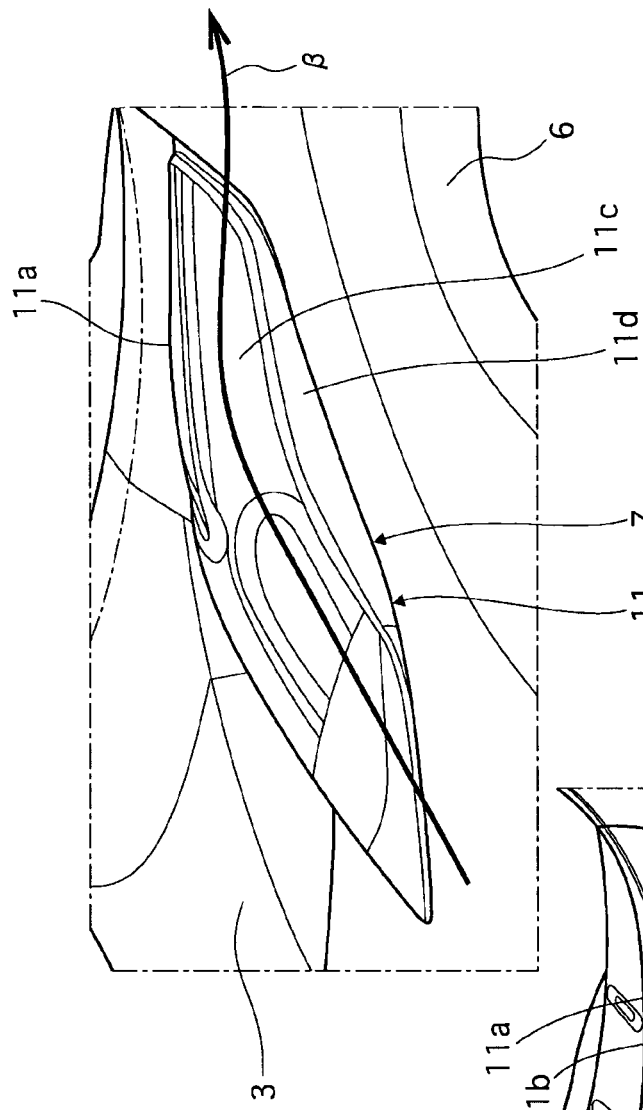
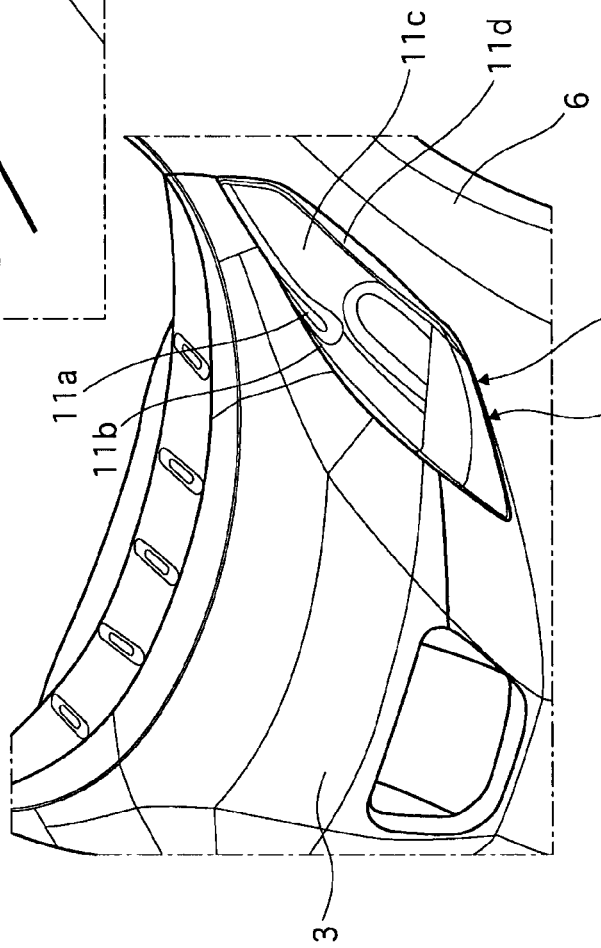
FIG. 8A
FIG. 8B

VEHICLE BOUNDARY LAYER AIR FLOW CONTROL STRUCTURE

CROSS-REFERENCE TO RELATED APPLICATIONS

This application is a U.S. National stage of International Application No. PCT/IB2010/001726, filed Jul. 13, 2010, which claims priority to Japanese Patent Application Nos. 2009-172328, filed on Jul. 23, 2009 and 2010-088844, filed on Apr. 7, 2010. The entire disclosures of Japanese Patent Application Nos. 2009-172328 and 2010-088844 are hereby incorporated herein by reference.

BACKGROUND

1. Field of the Invention

The present invention generally relates to a vehicle boundary layer air flow control structure. More specifically, the present invention relates a vehicle boundary layer air flow control structure that favorably control an air flow oriented toward an exterior door mirror or other side view mirror that is mounted to a vehicle body.

2. Background Information

An exterior door mirror or other side view mirror is mounted to a vehicle body of a vehicle to enable a driver of the vehicle to see in a diagonally rearward direction from a driver's seat. However, although inevitable in view of its purpose, a side view mirror protrudes sideways from the vehicle body. Thus, the traveling wind produced by the moving vehicle directly collides with the side view mirror. In addition, air flowing along an exterior surface of the vehicle body also collides against the side view mirror. The traveling wind directly colliding against the side view mirror is substantially laminar flow if the traveling wind has not been affected by an obstacle and does not cause a large amount of wind noise when it collides against the side view mirror. However, air flowing along an exterior surface of the vehicle body can be turbulent due to the shape of the exterior surface of the vehicle body. In this case, the turbulent air flow produced from the traveling wind flowing along the vehicle body will cause a large wind noise to emanate from the side view mirror when the turbulent air flow collides against the side view mirror.

A conventional countermeasure proposal has been presented in Japanese Laid-Open Patent Publication No. H06-312673 for solving this problem. This proposed technology involves either providing a wind deflector extending in the vehicle widthwise direction on an upper surface (in the case of a passenger car) of the vehicle in a position frontward of the side view mirror such that the wind deflector crosses an air flow direction, or providing a wind deflector extending in a vertical direction of the vehicle on an frontward surface (in the case of a commercial vehicle) of the vehicle such that the wind deflector crosses an air flow direction. With the technology described in Japanese Laid-Open Patent Publication No. H06-312673, when the vehicle is traveling, the wind deflector, as described above, serves to divert (bend) traveling wind that collides against the wind deflector by approximately 90 degrees in a widthwise outward direction of the vehicle when viewed from above. As a result, a transverse air flow is created that crosses directly in front of the side view mirror in a widthwise (inside-to-outside) direction of the vehicle. In the technology proposed in Japanese Laid-Open Patent Publication No. H06-312673, the transverse air flow crossing in front of the side view mirror serves to push air flowing toward the side view mirror in a widthwise outward direction of the vehicle such that the air flowing toward the side view mirror does not collide against the side view mirror.

Other conventional technologies for resolving the wind noise problem described above include the countermeasures described in Japanese Utility Model Application Publication Nos. S60-163174 and S61-094484. The technology proposed in Japanese Utility Model Application Publication No. S60-163174 provides an upward protuberance and a sideways projection on a vehicle body cowl panel to divert vehicle body traveling wind upward and outward at a position directly in front of a side view mirror. In this way, the problem of vehicle body traveling wind colliding directly against the side view mirror can be alleviated. The technology proposed in Japanese Laid-Open Patent Publication No. S61-094484 provides a deflector on a vehicle body surface directly in front of a side view mirror to divert vehicle body traveling wind upward at a position directly in front of the side view mirror. In this way, the problem of vehicle body traveling wind colliding directly against the side view mirror can be alleviated.

SUMMARY

It has been discovered that certain problems can occur in using the technology of the proposed wind deflector that is disclosed in Japanese Laid-Open Patent Publication No. H06-312673. Problems expected to occur with this technology will now be explained. The wind deflector is configured to create a transverse air flow crossing in front of the side view mirror by bending or deflecting the traveling wind that collides against wind deflector approximately 90 degrees such that the air flow is diverted in a widthwise outward direction as viewed from above the vehicle. Since the traveling wind must collide against the wind deflector and be turned by an angle as large as 90 degrees, a large dynamic pressure develops, which unavoidably results in an increase of the traveling resistance of the vehicle. In other words, the problem with the technology proposed in Japanese Laid-Open Patent Publication No. H06-312673 is that the wind noise of the side view mirror cannot be reduced without incurring an increase of the traveling resistance of the vehicle.

The side view mirror air flow control technologies proposed in Patent Japanese Utility Model Application Publication Nos. S60-163174 and S61-094484 attempt to prevent vehicle body traveling wind from colliding against a side view mirror by diverting the vehicle body traveling wind over and laterally outside of the side view mirror from a position directly in front of the side view mirror. Consequently, the air flow flowing cannot be maintained so as to flow along a side surface of the vehicle body because the air is diverted over and laterally outside of the side view mirror and passes through a region separated from the side surface of the vehicle body. When the air flow is diverted to pass through a region separated from the side surface of the vehicle body in this manner, the air flow tends to become turbulent more readily than when the air flow follows the contour of the exterior surface of the vehicle body. In other words, when the vehicle body traveling wind is subjected to an external force acting in a direction oriented crosswise to the air flow direction, such as force caused by a lateral wind or an airflow flowing along a side surface of the vehicle body to become more turbulent. Such turbulence tends to cause the traveling resistance of the vehicle to increase.

Also, in the technology proposed in Japanese Utility Model Application Publication Nos. S60-163174 and S61-094484, an air flow deflector is provided on a vehicle body to divert a vehicle body traveling wind over and laterally outside of a side view mirror at a position directly in front of the side view mirror. Since the air flow deflector is positioned directly in front of the side view mirror, a cross sectional area at a rearward end of the air flow (rearward in the air flow direction) decreases acutely, causing a problem that will now be explained. In other words, the diverted air flow resulting after the air flow has passed the air flow deflector suddenly loses an air flow guiding surface of the vehicle body and becomes peeled away from the air flow guiding surface of the vehicle body. As a result, after being diverted, the air flow swirls and becomes turbulent. This turbulent air flow cannot be sufficiently prevented from colliding against the side view mirror. Consequently, there is a concern that the side view mirror air flow control technologies proposed in Japanese Laid-Open Patent Publication No. S60-163174 and Japanese Laid-Open Patent Publication No. S61-094484 cannot sufficiently solve the previously described problem of wind noise resulting from an air flow colliding against a side view mirror.

Additionally, the technologies proposed in Japanese Utility Model Application Publication Nos. S60-163174 and S61-094484 incur the problem of the diverted air flow swirling and tending to become turbulent after it has passed the air flow deflector, thus causing the traveling resistance of the vehicle to increase.

In view of the problems described above, a vehicle boundary layer air flow control structure is proposed that attempts to solve the above described problems. In this disclosure, a vehicle boundary layer air flow control structure is disclosed that can allow a traveling wind heading toward a side view mirror to pass by the side view mirror without significantly colliding against the side view mirror such that the undesirable effect of causing a traveling resistance of the vehicle to increase can be diminished, and such that the air flow that has passed by the side view mirror will flow along a side surface of the vehicle body without tending to become turbulent and causing the traveling resistance of the vehicle to increase.

In accordance with one aspect of this present disclosure, a vehicle boundary layer air flow control structure is provided that basically comprises a vehicle body and a side view mirror. The vehicle body includes an exterior contoured surface with an air flow deflector. The side view mirror is attached to the vehicle body to provide a diagonally rearward direction to be viewed from a driver's seat. The air flow deflector has a downward air flow guiding surface provided in a vehicle body region of the exterior contoured surface of the vehicle body along which an air flow heading toward the side view mirror passes. The downward air flow guiding surface extends in an air flow direction of the air flow with respect to the side view mirror to divert the air flow underneath the side view mirror.

BRIEF DESCRIPTION OF THE DRAWINGS

Referring now to the attached drawings which form a part of this original disclosure:

FIG. 8A is a perspective view of the left headlamp lens of the vehicle body of the vehicle shown in FIG. 1 as seen from a position located in front of and to the left of the vehicle, FIG. 8B is an enlarged perspective view of the left headlamp lens shown in FIG. 8A and depicting an air flow controlled by a widthwise inside surface of the left headlamp lens;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
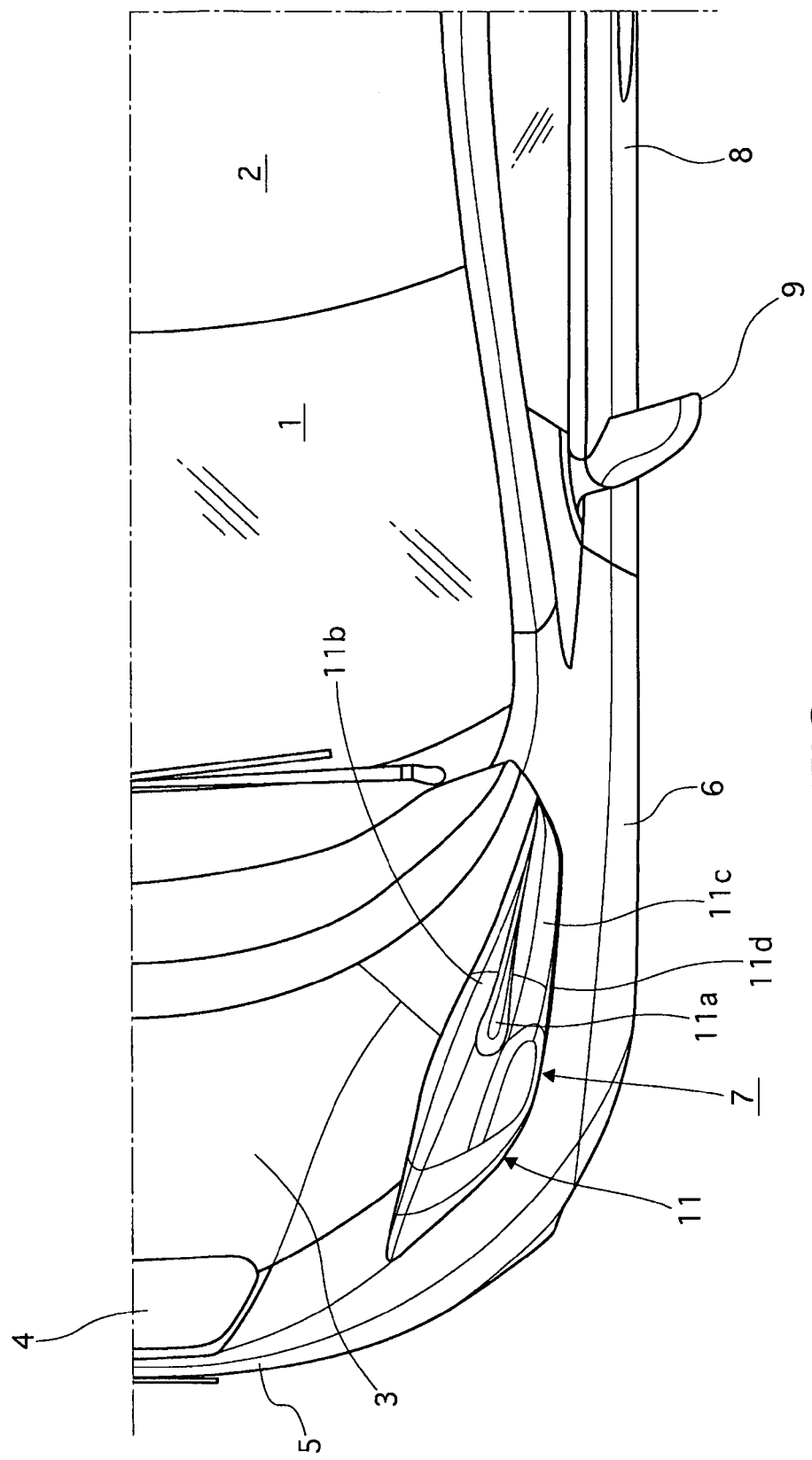
FIG. 1 is a partial top plan view of a left frontward portion of a vehicle body of a vehicle equipped with a vehicle boundary layer air flow control structure for controlling boundary layer air flow with respect to a side view minor in accordance with a first embodiment.
Figure 2:
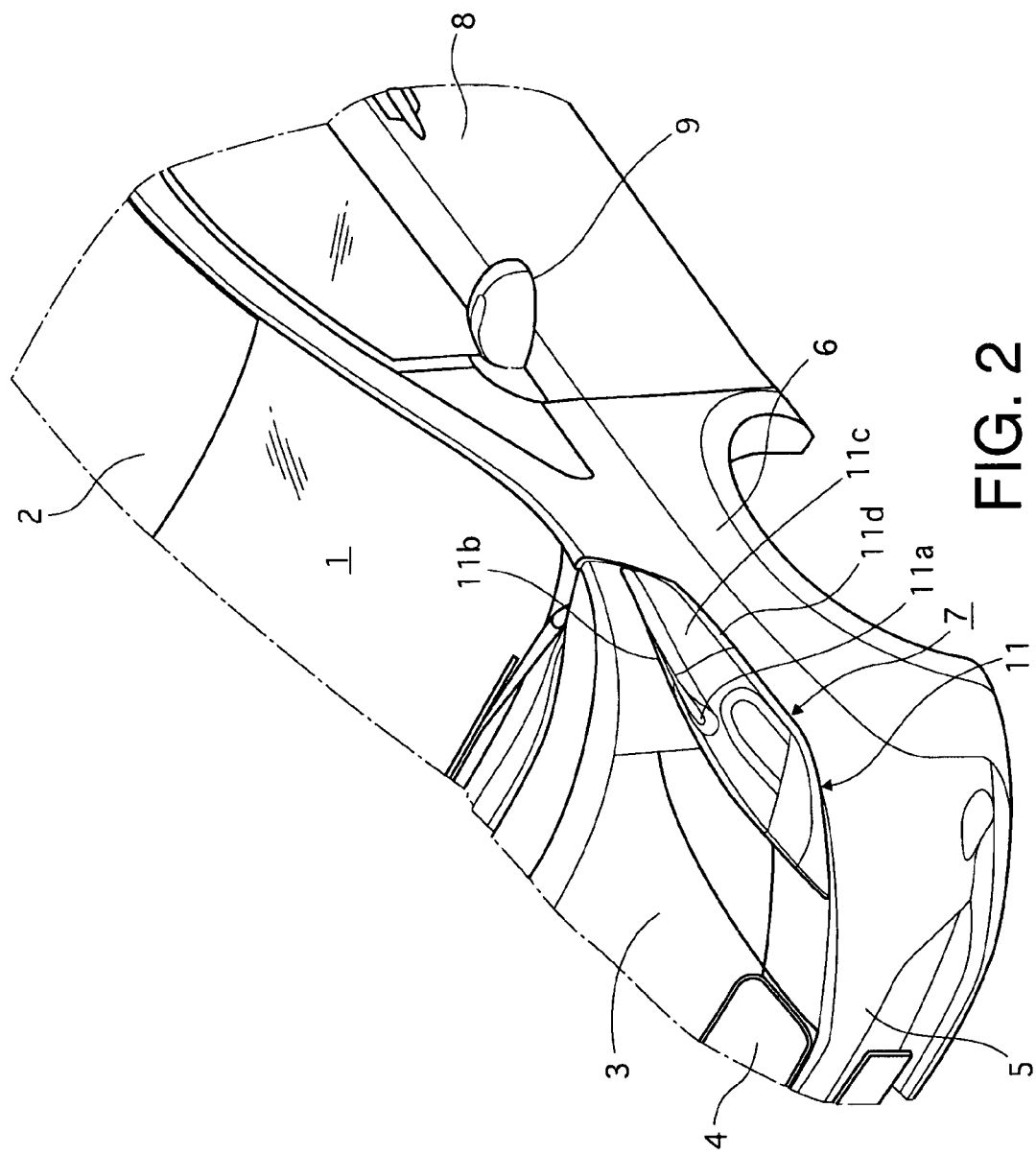
FIG. 2 is a partial perspective view of the left frontward portion of the vehicle body of the vehicle shown in FIG. 1 as viewed from above a leftward frontward portion of the vehicle.
Figure 3:
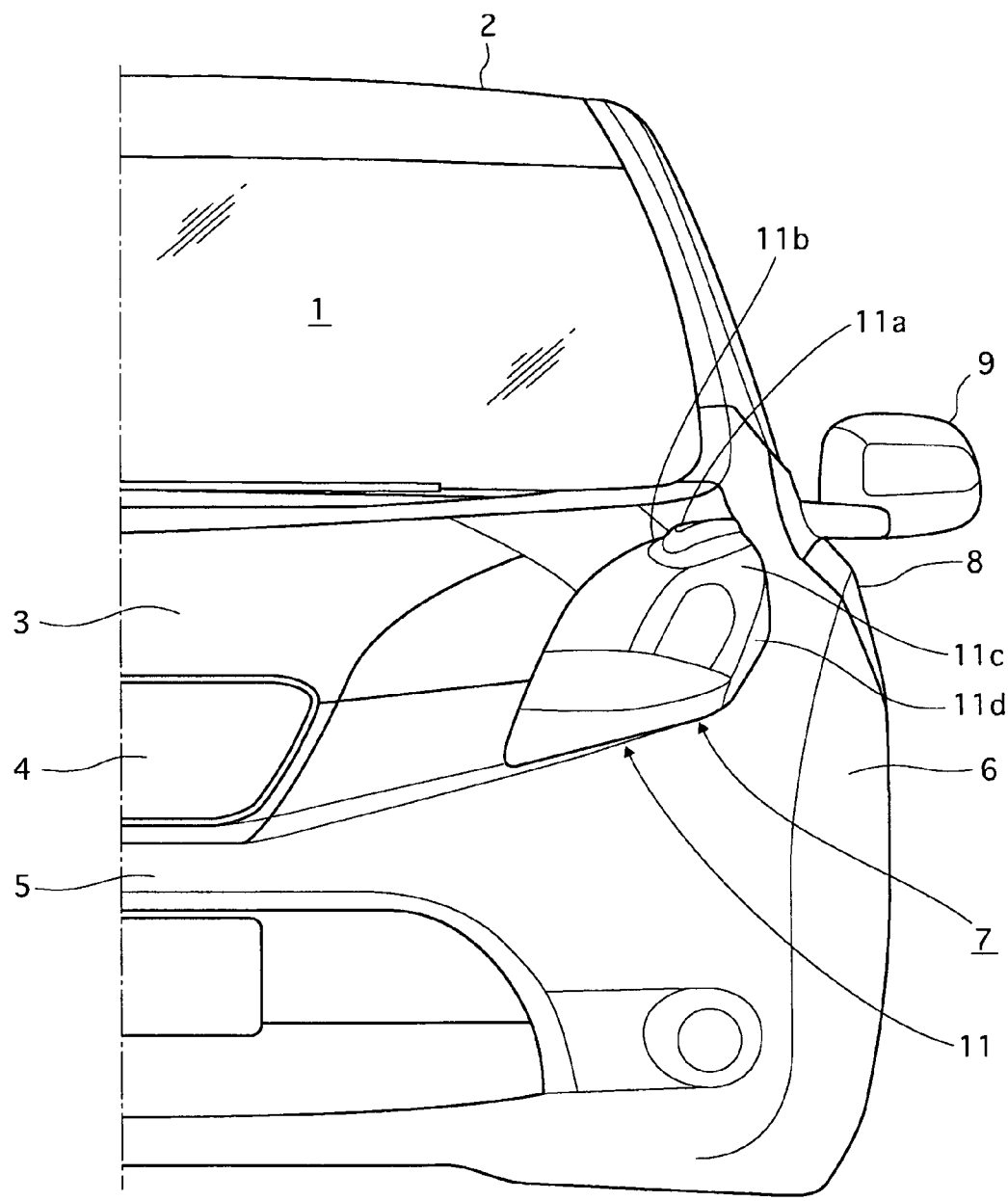
FIG. 3 is a partial front elevational view of the left frontward portion of the vehicle body of the vehicle shown in FIG. 1 as viewed from in front of the vehicle.
Figure 4:
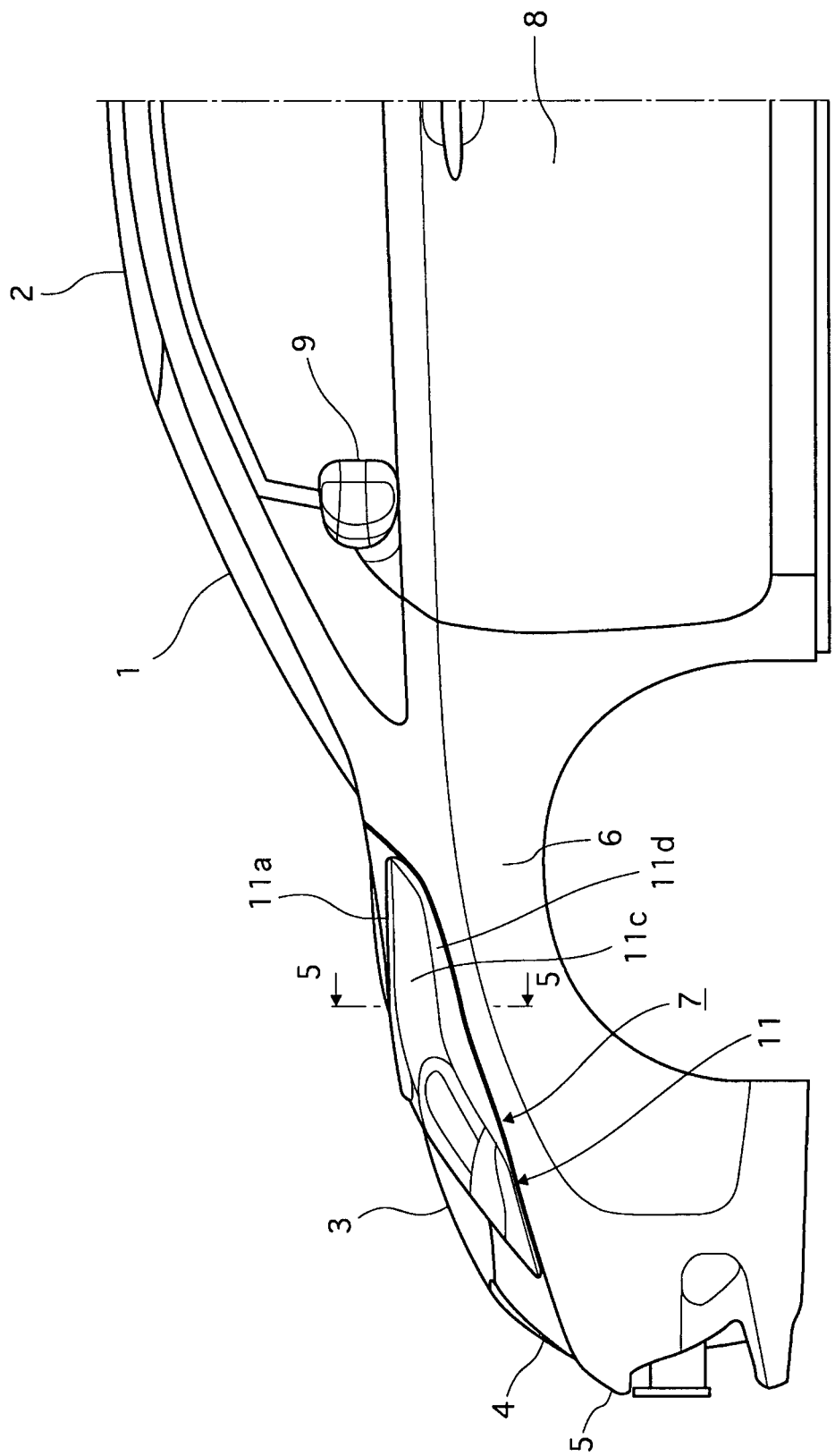
FIG. 4 is a partial side elevational view of the left frontward portion of the vehicle body of the vehicle shown in FIG. 1.
Figure 5:
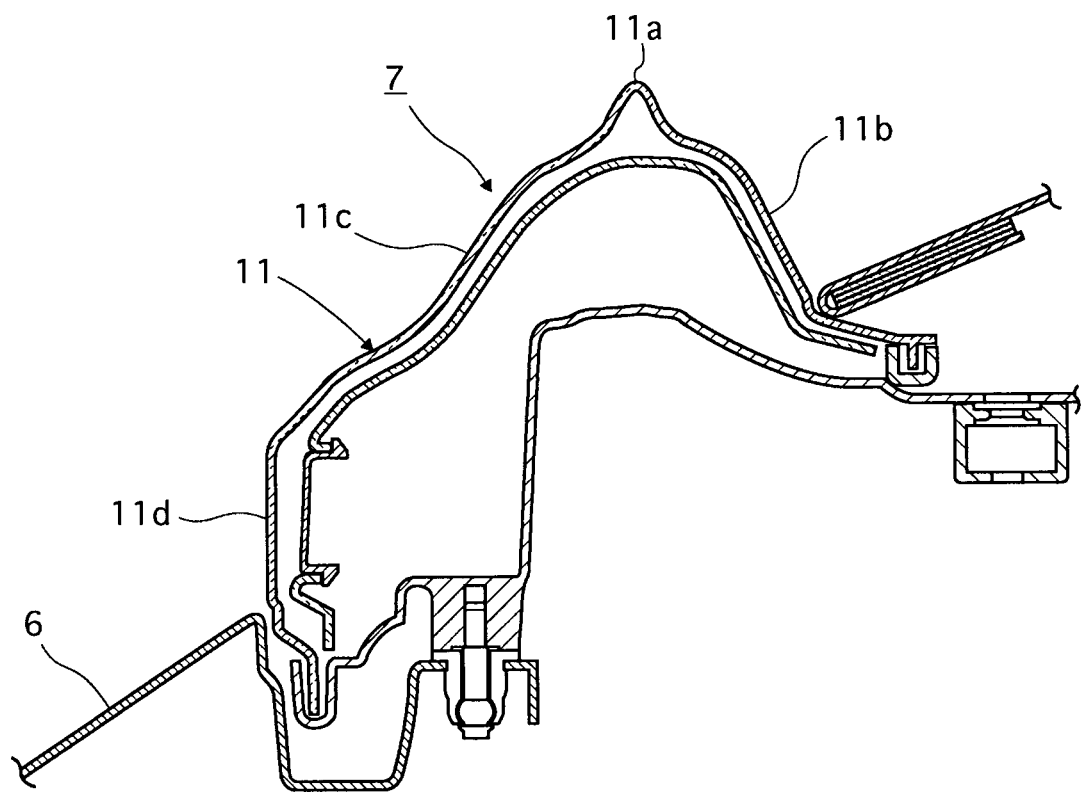
FIG. 5 is a simplified vertical cross sectional view of a left headlamp lens as viewed along section line 5-5 of FIG. 4.

Referring initially to FIGS. 1 to 4, a left frontward portion of a vehicle body of a vehicle is illustrated that is equipped with a vehicle boundary layer air flow control structure for controlling boundary layer air flow in accordance with the illustrated embodiment. As shown in FIGS. 1 to 4, the vehicle has a front windshield 1, a vehicle body roof panel 2, a hood 3 covering an upper opening of an engine room or motor room, a front grill 4, a front bumper 5, a left front fender 6, a left headlamp 7, a left front door 8, and a left side view (door) mirror 9. As used herein, the term "vehicle body" includes, but not is limited to the front windshield 1, the vehicle body roof panel 2, the hood 3, the front grill 4, the front bumper 5, the left front fender 6, the left headlamp 7, the left front door 8, and the left side view mirror 9. The left side view mirror 9 is mounted to the left front door 8 to enable a diagonally leftward and rearward direction of the vehicle to be viewed from a driver's seat. The left frontward portion of the vehicle body is configured as shown in FIGS. 1 to 4. When the vehicle is moving, air flows from front to rear along a vehicle body exterior contoured surface that forms the external shape of the vehicle body. It is desirable to form the vehicle body exterior contoured surface such that a boundary layer is formed with laminar air flow along the body. If the vehicle body exterior contoured surface creates turbulences, then the drag of the vehicle will increase. In this illustrated embodiment, a portion of the air flowing in the boundary layer from front to rear along the vehicle body passes along a particular vehicle body region of an exterior contoured surface of the vehicle body and then heads toward the side view mirror 9. This vehicle body region is at least partially formed by, for example, an exterior surface of a headlamp lens 11 of the headlamp 7 that forms a portion of the vehicle body exterior contoured surface. The exterior surface of the headlamp lens 11 is configured to have a cross sectional shape shown in FIG. 5.

Figure 11:
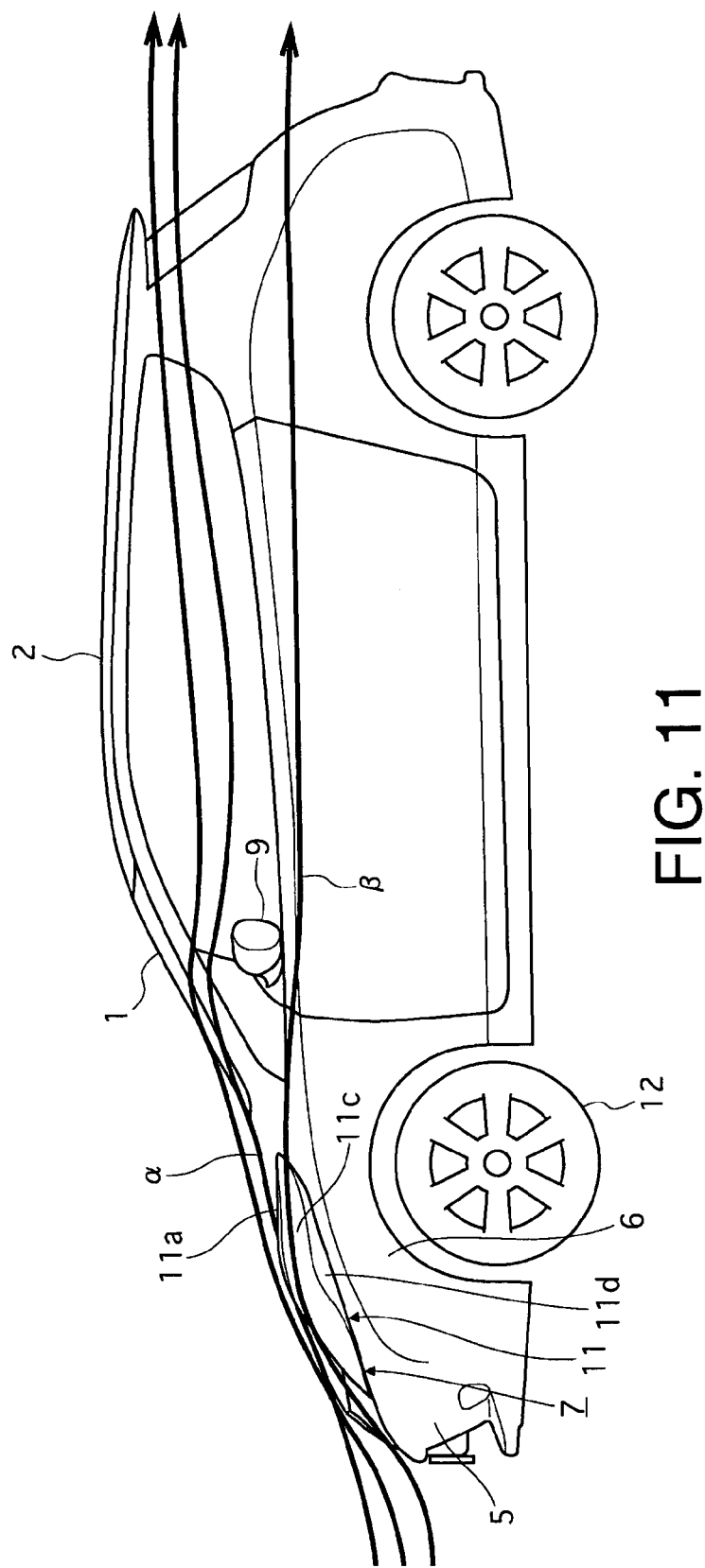
FIG. 11 is a side elevational view of the vehicle shown in FIGS. 1 to 10 showing an air flow obtained in a wind tunnel experiment with the vehicle boundary layer air flow control structure controlling boundary layer air flow with respect to the side view mirror in accordance with the illustrated embodiment.
Figure 12:
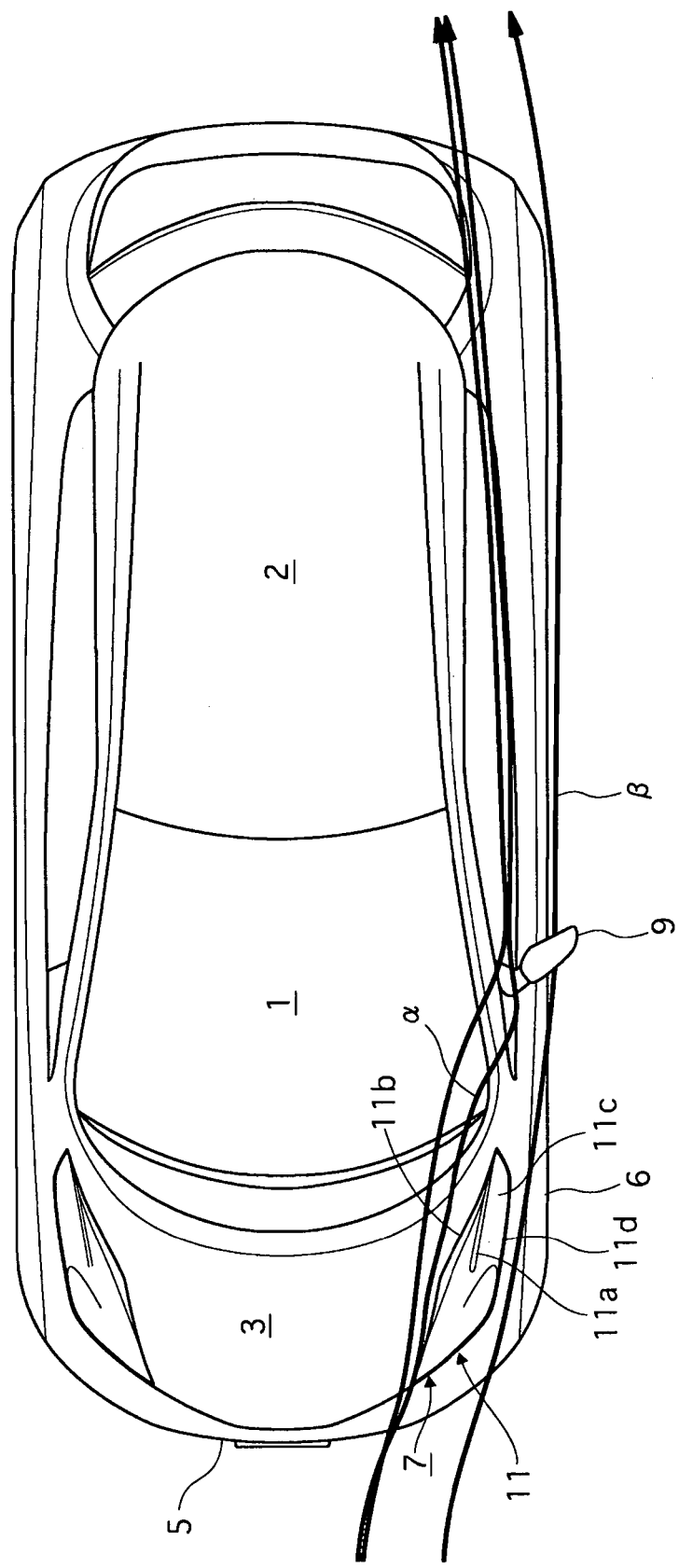
FIG. 12 is a top plan view of the vehicle shown in FIGS. 1 to 11 showing an air flow obtained in a wind tunnel experiment with the vehicle boundary layer air flow control structure controlling boundary layer air flow the side view mirror in accordance with the illustrated embodiment.
Figure 13:
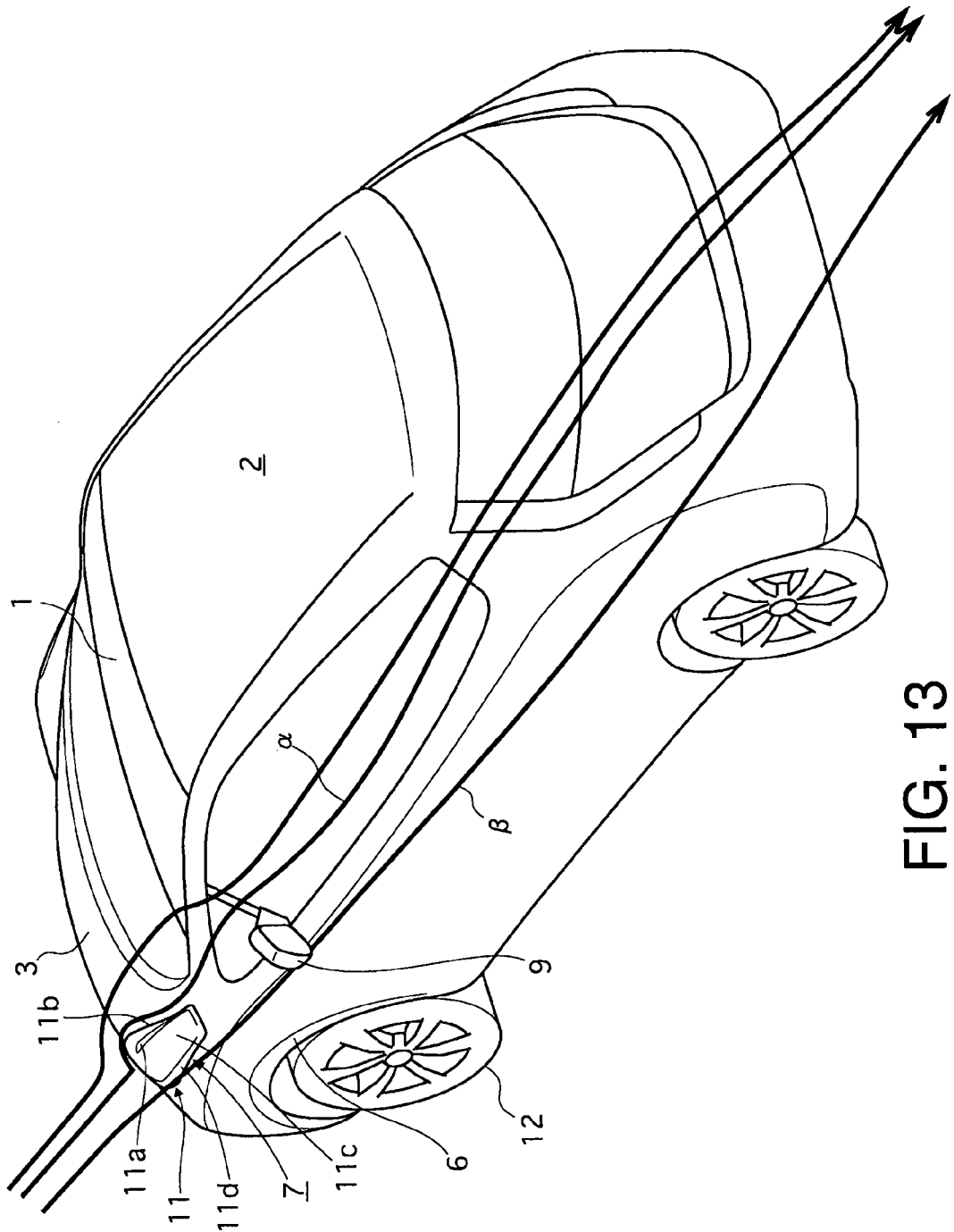
FIG. 13 is a left rear perspective view of the vehicle shown in FIGS. 1 to 12 showing an air flow obtained in a wind tunnel experiment with the vehicle boundary layer air flow control structure controlling boundary layer air flow with respect to the side view mirror in accordance with the illustrated embodiment.
Figure 14:
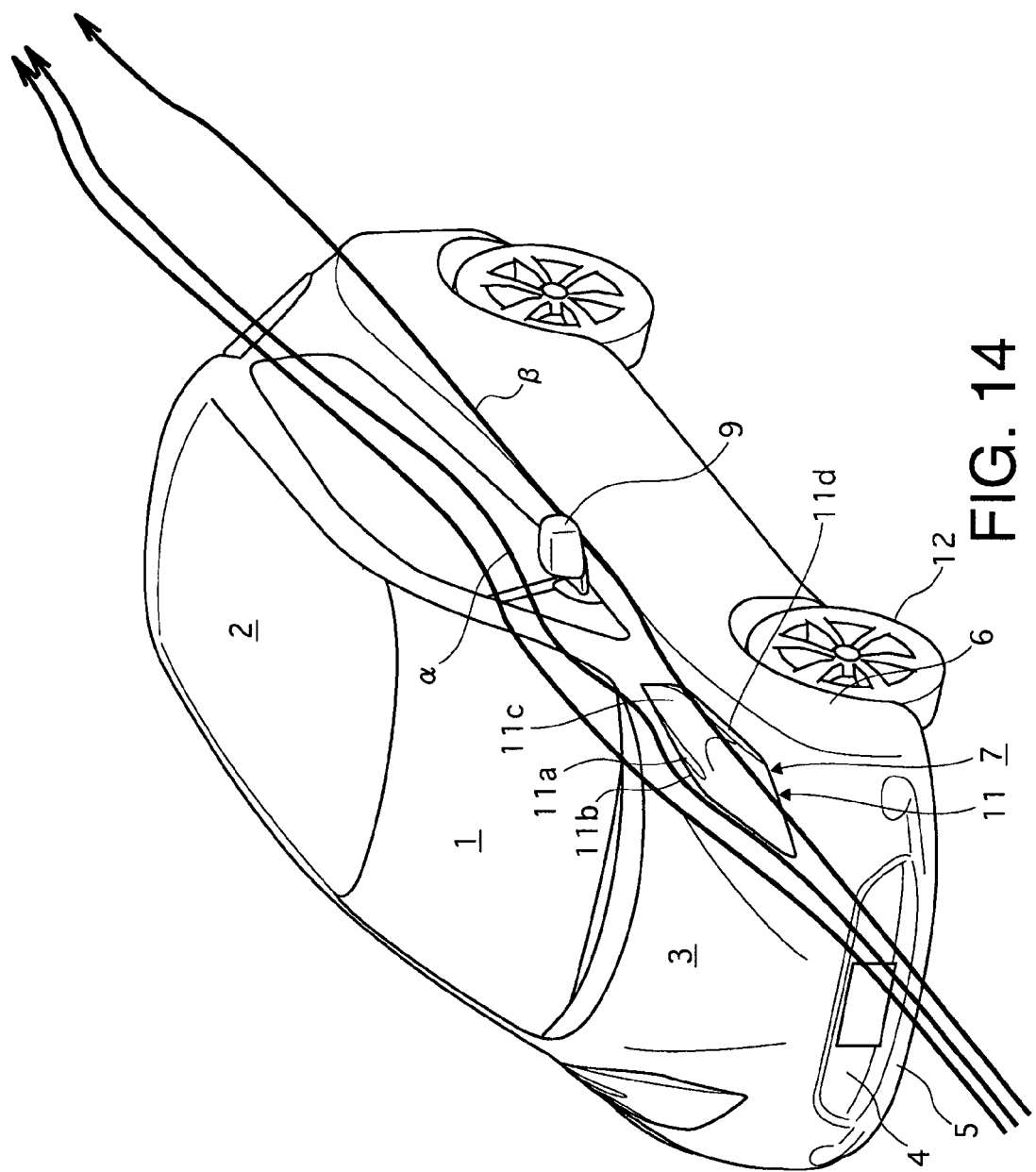
FIG. 14 is a left front perspective view of the vehicle shown in FIGS. 1 to 10 showing an air flow obtained in a wind tunnel experiment with the vehicle boundary layer air flow control structure controlling boundary layer air flow with respect to the side view mirror in accordance with the illustrated embodiment.
Figure 15:
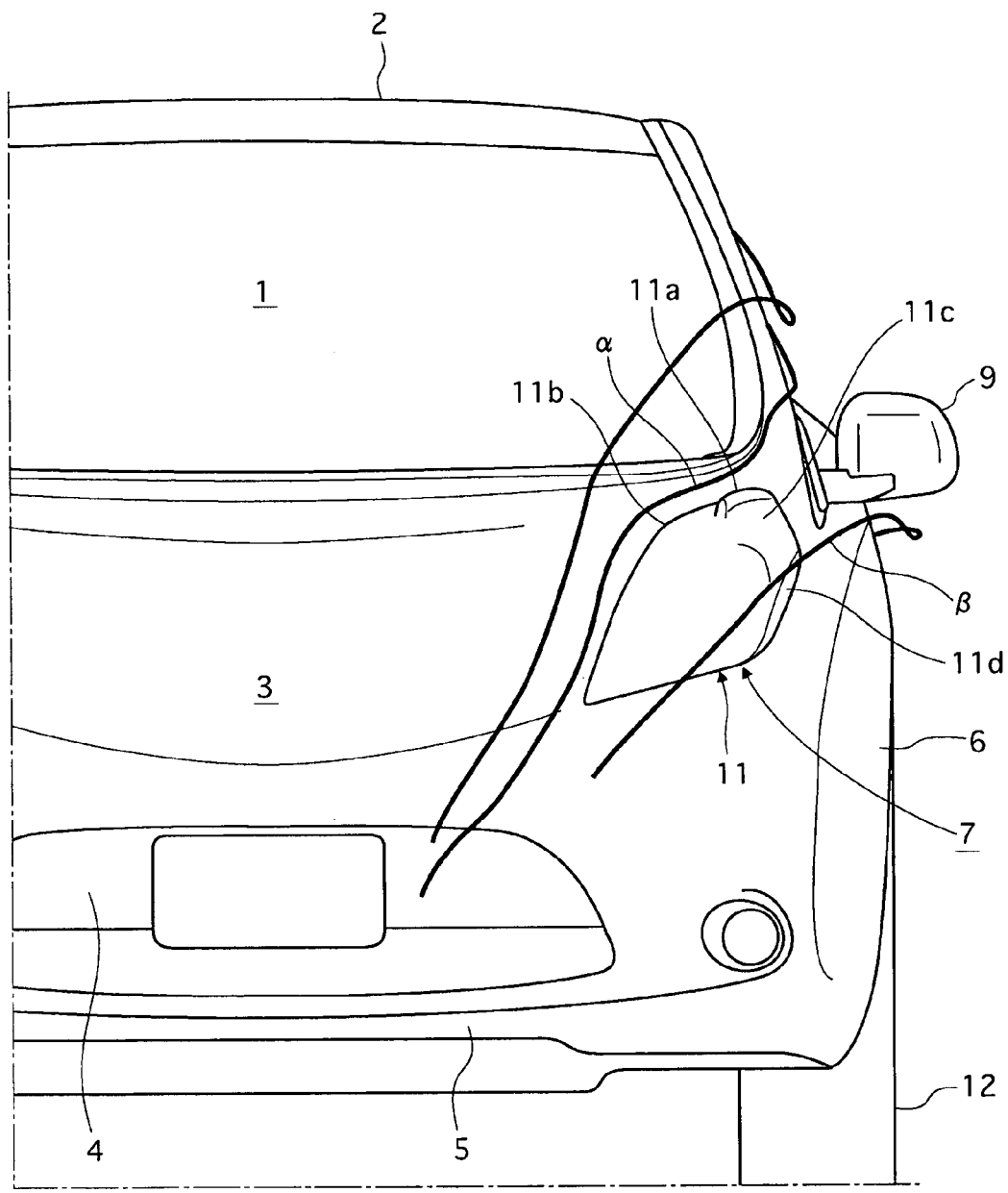
FIG. 15 is a front elevational view of the vehicle shown in FIGS. 1 to 10 showing an air flow obtained in a wind tunnel experiment with the vehicle boundary layer air flow control structure controlling boundary layer air flow with respect to the side view mirror in accordance with the illustrated embodiment.

As shown in FIGS. 1 to 4, in this illustrated embodiment, the headlamp lens 11 constitutes an air flow deflector that includes an air flow dividing ridge 11a, an inward longitudinal air flow guiding surface 11b and an outer downward air flow guiding surface 11c. The exterior surface of the headlamp lens 11 has a raised middle portion in which exists a ridgeline (apex edge) that extends in an air flow direction of the aforementioned air flow from a frontward end to a rearward end. The frontward end of the ridgeline (apex edge) is positioned farther forward in a longitudinal direction of the vehicle than a rotational center of a front wheel 12 (see, FIGS. 11, 13 and 14) housed inside the front fender 6. In this way, the exterior surface of the headlamp lens 11 is provided with the air flow dividing ridge 11a that extends in a flow direction of the aforementioned air flow.

The air flow dividing ridge 11a serves to divide boundary layer air flow flowing toward the side view mirror 9 along the vehicle body exterior contoured surface into an inner air stream and an outer air stream. The inner air stream is located on the widthwise inside of the air flow dividing ridge 11a, while the outer is located on the widthwise outside of the air flow dividing ridge 11a. The air flow dividing ridge 11a is arranged and configured with respect to the rest of the vehicle body exterior contoured surface to direct the inner and outer air streams such that the air flows do not mix and become turbulent. Thus, the positioning of the air flow dividing ridge 11a in the vehicle widthwise direction is set to prevent the air flows from mixing and becoming turbulent to the greatest extent possible. Therefore, in this illustrated embodiment, the air flow dividing ridge 11a is arranged, for example, in such a position that the ridgeline of the air flow dividing ridge 11a is located inward of the side view mirror 9 in the vehicle widthwise direction.

Figure 6:
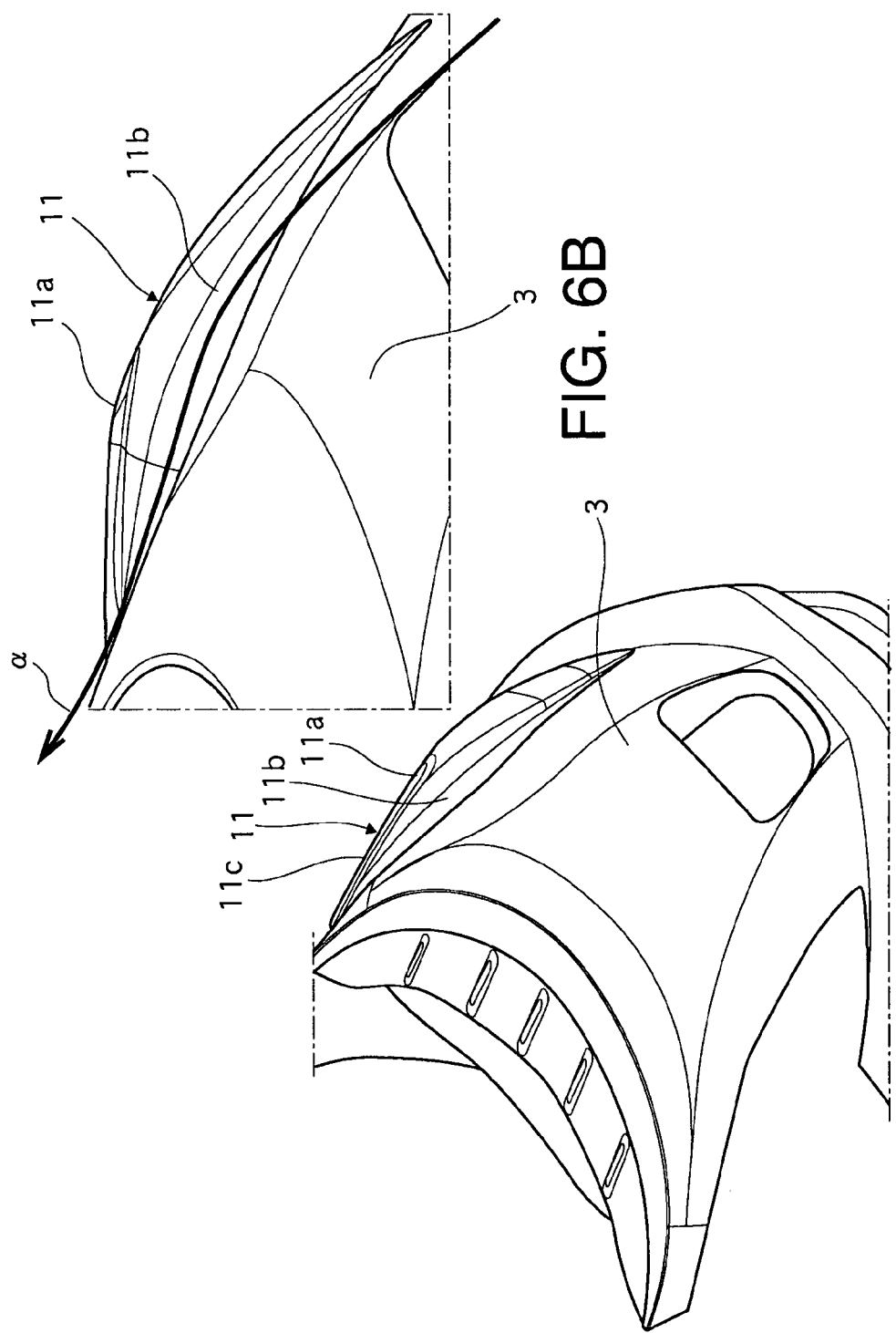
FIG. 6A a partial perspective view of the left headlamp lens of the vehicle body of the vehicle shown in FIG. 1.
FIG. 6B is an enlarged perspective view of the left headlamp lens shown in FIG. 6A and depicting an air flow controlled by a widthwise inside surface of the left headlamp lens.

A widthwise-inward surface is located on an inward side of the air flow dividing ridge 11a with respect to the vehicle widthwise direction. This widthwise-inward surface of the air flow dividing ridge 11a constitutes the inward longitudinal air flow guiding surface 11b that serves to divert the aforementioned inner air stream from a course oriented toward the side view mirror 9 to a course oriented toward a point located inward of the side view mirror 9 in the vehicle widthwise direction. In the illustrated embodiment, the inward longitudinal air flow guiding surface 11b serves to divert the aforementioned inner air stream toward the windshield 1. Therefore, as clearly shown in FIGS. 1, 2, 6 and 7, the inward longitudinal air flow guiding surface 11b (widthwise-inward surface of the air flow dividing ridge 11a) is configured to form an inwardly curved section that curves (concave) inward in the vehicle widthwise direction as it extends in a downstream direction of the inner air stream. Thus, the inward longitudinal air flow guiding surface 11b ultimately points inward of the side view mirror 9 in the vehicle widthwise direction. As a result, as indicated with the arrow a in FIGS. 6 and 7, the inner air stream is diverted so as to pass inwardly of the side view mirror 9 with respect to the vehicle widthwise direction (i.e., toward the windshield 1) while in a laminar state (i.e., the air flows such that it moves along regular flow paths).

Figure 7:
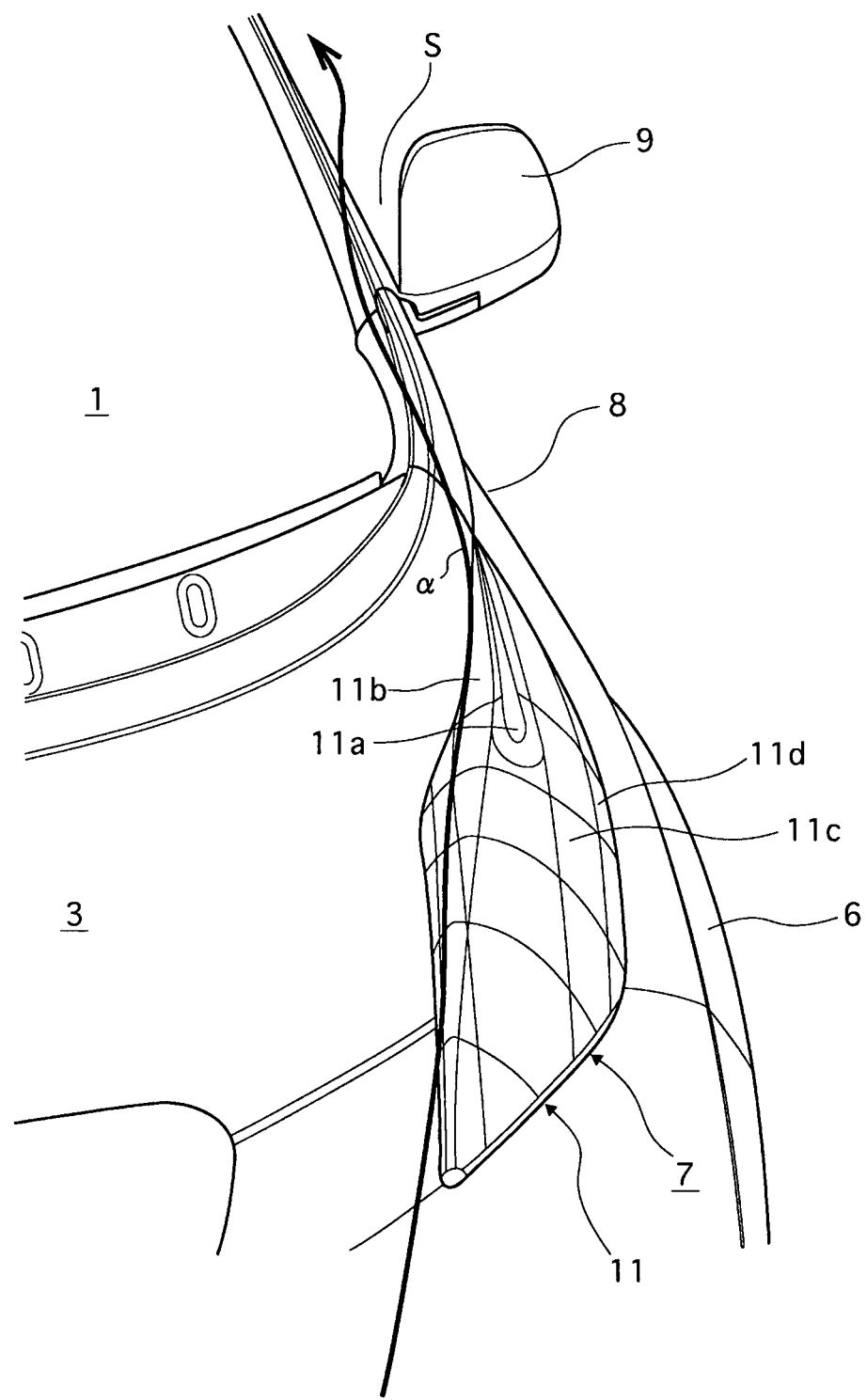
FIG. 7 is a perspective view of the left headlamp lens of the vehicle body of the vehicle shown in FIG. 1 as viewed from in front of the vehicle and depicting an air flow controlled by the widthwise surface of the left headlamp lens.

The inwardly curved section forming the inward longitudinal air flow guiding surface 11b is configured such that a downstream end portion thereof (i.e., downstream in the flow direction of the air flow) forms an upwardly sloped air flow guiding surface serving to direct the air flow to a level above a space S between the side view mirror 9 and the vehicle body, as indicated with the arrow α in FIG. 7.

A widthwise-outward surface is located on an outward side of the air flow dividing ridge 11a with respect to the vehicle widthwise direction. This widthwise-outward surface constitutes the outer downward air flow guiding surface 11c serving to divert the aforementioned outer air stream from a course oriented toward the side view mirror 9 to a course oriented toward a point located under the side view mirror 9. As shown clearly in FIGS. 8 and 9, the outer downward air flow guiding surface 11c is configured such that a rearmost end thereof in an air flow direction blends smoothly with the external shape of a vehicle body panel located farther rearward in the air flow direction. Consequently, as clearly shown in FIGS. 2 to 5, the contour of the vehicle body is such that when viewed along a longitudinal direction of the vehicle, an upper portion of the outer downward air flow guiding surface 11c (widthwise-outward surface of the air flow dividing ridge 11a) near the ridgeline of the air flow dividing ridge 11a slants inward in the vehicle widthwise direction. Meanwhile, when the vehicle is viewed from a side in a widthwise direction, the outer downward air flow guiding surface 11c forms a downwardly sloping surface that heads downward in a vertical direction of the vehicle as it extends in the flow direction of the outer air stream such that it ultimately points underneath the side view mirror 9. As a result, the downwardly sloping surface of the outer downward air flow guiding surface 11c diverts the air flow under the side view mirror 9 as indicated with the arrow 13 in FIGS. 8 and 9. Thus, the diverted air flow from the outer downward air flow guiding surface 11c passes under the side view mirror 9 in a laminar state such that it does not collide against the side view mirror 9.

The outer downward air flow guiding surface 11c (widthwise-outward surface of the air flow dividing ridge 11a) is further configured such that a bottommost edge section thereof forms a substantially vertical upright surface 11d, as clearly shown in FIGS. 2 to 5. The upright surface 11d is a flat surface in the vertical direction. As a result, when the bottommost edge section (upright surface 11d) of the outer downward air flow guiding surface 11c is viewed in a longitudinal direction of the vehicle, the bottommost edge section (upright surface 11d) does not blend smoothly to the external shape of the fender 6. The reason for providing the upright surface 11d will now be explained. If the downwardly sloping surface is made to encompass the bottommost edge section of the outer downward air flow guiding surface 11c (widthwise-outward surface of the air flow dividing ridge 11a), then the outer downward air flow guiding surface 11c (widthwise-outward surface of the air flow dividing ridge 11a) will adjoin smoothly with the exterior surface contour of the fender 6 when viewed in a longitudinal direction of the vehicle. Consequently, a side surface air flow flowing along a side surface of the vehicle body toward the side view mirror 9 will intermix with the aforementioned outer air stream and cause turbulence, and the turbulence will collide against the side view mirror 9 and cause wind noise to occur. Thus, in this illustrated embodiment, the reason for providing a substantially vertical upright surface 11d in the bottommost edge section of the outer downward air flow guiding surface 11c (widthwise-outward surface of the air flow dividing ridge 11a) is to use the upright surface 11d to prevent the aforementioned vehicle body side surface air flow from intermixing with the outer air stream, becoming turbulent, and colliding with the side view mirror 9. As used herein, the phrases "blends smoothly" or "blend smoothly" refers to adjacent mating surfaces of mating parts whose contours are aligned at their mating edges to form a continuous, non-abrupt transition therebetween if any gap or depression existing between the two mating parts were filled in. For example, in the case of the surfaces of the headlamp lens 11 mating with the surfaces of the fender 6, the air flow guiding surfaces 11b and 11c blend smoothly with the mating surfaces of the fender 6.

The inward longitudinal air flow guiding surface 11b that is provided on the widthwise inward side of the ridgeline of the air flow dividing ridge 11a and the outer downward air flow guiding surface 11c that is provided on the widthwise outward side of the ridgeline are configured such that an imaginary extension plane of the guiding surface 11b and the guiding surface 11c extending in downstream directions of the inner and outer air streams do not intersect each other. In other words, if one imagines the downstream ends of the surfaces of the guiding surfaces 11b and 11c continue to extend rearward at the same angle and orientation that they have at their downstream ends, then the imaginary extension planes will not intersect. In this way, the inner air stream α and the outer air stream β produced by the air flow dividing ridge 11a can be prevented from intermixing and from becoming turbulent.

Figure 10:
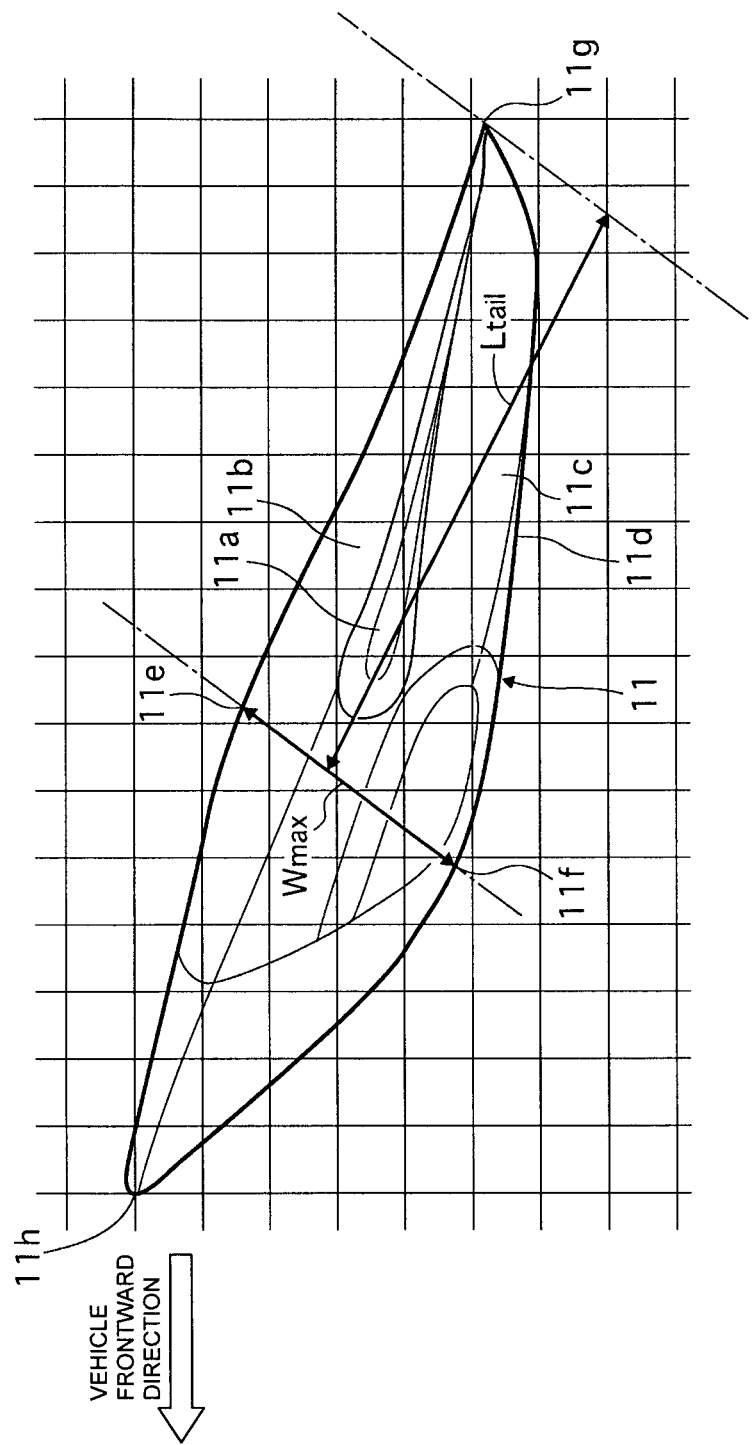
FIG. 10 is a top plan view of the left headlamp lens for explaining a maximum width of the left headlamp lens shown in FIGS. 6 to 9.

As shown in FIG. 10, the inward longitudinal air flow guiding surface 11b has a widthwise-inwardly protruding portion 11e and the outer downward air flow guiding surface 11c has a widthwise-outwardly protruding portion 11f. The headlamp lens 11 with the air flow dividing ridge 11a in this illustrated embodiment is configured such that a maximum width Wmax is located between the protruding portions 11e and 11f as from above the vehicle. The maximum width Wmax of the headlamp lens 11 is equal to or larger than a vertical height of the side view mirror 9. In this way, the inner air stream α and the outer air stream β formed by the dividing action of the air flow dividing ridge 11a can be reliably separated from each other and reliably prevented from intermixing and from becoming turbulent. Additionally, the aforementioned side view mirror boundary layer air flow control can be accomplished more reliably such that the inner air stream α passes along a path lying inward of the side view mirror 9 in the vehicle widthwise direction and such that the outer air stream β passes along a path lying under the side view mirror 9 as explained previously.

Additionally, as shown in FIG. 10, the headlamp lens 11 with the air flow dividing ridge 11a in this illustrated embodiment is configured such that a distance Ltail from a position where the maximum width Wmax between the protruding portions 11e and the 11f exists (i.e., from a line joining the protruding portions 11e and 11f) to a downstream rearward end 11g of the air flow dividing ridge 11a is at least 1.9 times as long as the maximum width Wmax (Ltail/Wmax≥1.9). Thus, an angular change amount of the air flow directions of the inward longitudinal air flow guiding surface 11b and the outer downward air flow guiding surface 11c does not reach a large value exceeding an air flow peeling or separation threshold of 15 degrees in a downstream region spanning from the maximum width position of the air flow dividing ridge 11a to the downstream rearward end 11g in an air flow direction. Consequently, after the inner air stream α and the outer air stream β are formed by the air flow dividing ridge 11a in an upstream region spanning from an upstream frontward end 11h to the maximum width position in an air flow direction, the air flows α and β do not separate from the inward longitudinal air flow guiding surface 11b and the outer downward air flow guiding surface 11c in the downstream region spanning from the maximum width position of the air flow dividing ridge 11a to the downstream rearward end 11g.

The inner air stream α and the outer air stream β remain in a laminar state when they are diverted under the guidance of the air flow guiding surfaces 11b and 11c of the air flow dividing ridge 11a. Moreover, after the inner air stream α and the outer air stream β are diverted by the air flow guiding surfaces 11b and 11c, the inner air stream α and the outer air stream β can be directed inward of and underneath the side view mirror 9 in a laminar state even after they separate from the air flow guiding surfaces 11b and 11c. As a result, the inner air stream α and the outer air stream β are guided by the air flow guiding surfaces 11b and 11c such that the inner air stream α and the outer air stream β can pass inward of and underneath the side view mirror 9, respectively, in a laminar state.

Operational effects of the vehicle boundary layer air flow control structure according to the illustrated embodiment will now be explained based on FIGS. 11 to 15, which show flows of air obtained in a wind tunnel experiment. In this illustrated embodiment, the exterior surface of the headlamp lens 11 forms a portion of a vehicle body exterior contoured surface in a region of the vehicle body where an air flow flows toward the side view mirror 9. As mentioned above, the exterior surface of the headlamp lens 11 is provided with the air flow dividing ridge 11a that extends in a flow direction of the air flow from a frontward end to the rearward end. In the illustrated embodiment, the upstream frontward end 11h of the air flow dividing ridge 11a is positioned farther forward in a longitudinal direction of the vehicle than the rotational center of the front wheel 12 as shown in FIGS. 11 and 13 to 15. As a result, the following operational effect can be obtained. Namely, an air flow moving toward the side view mirror 9 along the vehicle body exterior contoured surface can be divided into the inner air stream α and the outer air stream located in relative inward and outward positions, respectively, in the vehicle widthwise direction as shown in FIGS. 11 to 15 such that the air flows α and β do not mix with each other and become turbulent.

In this embodiment, the widthwise inwardly facing surface of the air flow dividing ridge 11a constitutes the inward longitudinal air flow guiding surface 11b configured to form an inwardly curved section that curves inward in the vehicle widthwise direction as it extends in a downstream direction of the inner air stream such that it ultimately points inward of the side view mirror 9 in the vehicle widthwise direction. As a result, as indicated FIGS. 11 to 15, the inner air stream α is reliably diverted by the inwardly curved section of the inward longitudinal air flow guiding surface 11b so as to pass inwardly of the side view mirror 9 with respect to the vehicle widthwise direction (i.e., toward the windshield 1). Moreover, after being diverted, the air flow α can be passed inwardly of the side view mirror 9 while in a laminar state.

The diversion and control of the inner air stream α are accomplished with an even greater degree of reliability because the inward longitudinal air flow guiding surface 11b extends in the downstream direction of the air flow from a position frontward (in a longitudinal direction of the vehicle) of the rotational center of the front wheel 12 due to the upstream-side starting point (the upstream frontward end 11h) of the air flow dividing ridge 11a. Thus, the inner air stream α heading toward the side view mirror 9 can be prevented from colliding with the side view mirror 9 and wind noise that would be produced by a collision of the air flow α with the side view mirror 9 can be prevented or reduced. Additionally, a dynamic pressure produced by the air flow α colliding against the side view mirror 9 can be reduced to such a degree that it can substantially be ignored.

Also, with this illustrated embodiment, since the inward longitudinal air flow guiding surface 11b passes the diverted air flow α inward of the side view mirror 9 in a laminar state, the diverted air flow α does not peel from the inward longitudinal air flow guiding surface 11b. In this way, the diverted air flow α does not undergo swirling or become turbulent. Consequently, the diverted air flow can be reliably prevented from becoming turbulent and colliding against the side view mirror 9 and wind noise caused by such a collision ceases to be a problem. If the diverted air flow were to become turbulent, then the diverted air flow would cause the traveling resistance (drag) of the vehicle to increase. However, with this illustrated embodiment, the diverted air flow α can be passed inward of the side view mirror 9 in a laminar state and the problem of the diverted air flow α causing the traveling resistance of the vehicle to increase does not occur.

After being diverted, the laminar air flow α passes inward of the side view mirror 9 with respect to the vehicle widthwise direction. Thus, even though a side surface of the vehicle body leans inward in the vehicle widthwise direction as the vehicle body extends in an upward direction with respect to the vehicle body, the air flow α can flow along the vehicle body side surface as shown in FIGS. 11 to 15. Consequently, the air flow α does not pass by the side view mirror 9 at a place where the air flow α would separate from the vehicle body side surface as in the case of an air flow passing above or to the outside of the side view mirror 9. Consequently, after the air flow α passes the side view mirror 9, the air flow α enjoys a lateral guiding effect provided by the vehicle body side surface and does not readily become turbulent even if it is subjected to an external force acting in a direction oriented crosswise to the air flow direction. Thus, the problem of the diverted air flow becoming turbulent and causing the traveling resistance of the vehicle to increase does not occur.

As shown in FIG. 7, a downstream (i.e., downstream in the flow direction of the air flow) portion of the guiding wall surface of the inward longitudinal air flow guiding surface 11b is configured to slope upward and direct the air flow α to a level above a space S between the side view mirror 9 and the vehicle body. Consequently, the air flow α passes inward of the side view mirror 9 in the vehicle widthwise direction and does not pass through the narrow space S. As a result, the air flow α can be prevented from generating noise, which might occur if it passed through the narrow space S.

An air flow flowing toward the side view mirror 9 along the exterior contoured surface of the vehicle body is divided by the air flow dividing ridge 11a into the inner air stream α and the outer air stream β positioned inward and outward of each other in the vehicle widthwise direction such that the air flows α and β do not intermix and/or become turbulent. Additionally, the air flow guiding surfaces 11b and 11c of the air flow dividing ridge 11a are configured such that extension planes of the guiding surfaces 11b and 11c extending in downstream directions of the inner and outer air streams α and β do not intersect each other. As a result, the inner air stream α and the inner air stream (3 do not intermix and/or become turbulent. Thus, the air flows can be prevented from colliding against the side view mirror 9 and the large wind noise that could result from such a collision can be avoided.

As mentioned above, the widthwise-outward surface of the air flow dividing ridge 11a constitutes the outer downward air flow guiding surface 11c that is configured to slope downward in a vertical direction of the vehicle as the air flow guiding surface 11c extends in a downstream direction of the outer air stream β such that the air flow guiding surface 11c ultimately points underneath the side view mirror 9. As shown in FIGS. 11 to 15, the outer air stream β heading toward the side view mirror 9 diverted underneath the side view mirror 9 by the downward slope of the outer downward air flow guide surface 11c, and the diverted air flow β is passed underneath the side view mirror 9 in a laminar state. The diversion and control of the outer air stream β are accomplished with an even greater degree of reliability because the outer downward air flow guiding surface 11c extends in the downstream direction of the air flow from a position frontward (in a longitudinal direction of the vehicle) of a rotational center of the front wheel due to the aforementioned upstream-side starting point of the air flow dividing ridge 11a. Thus, the outer air stream β heading toward the side view mirror 9 can be prevented from colliding with the side view mirror 9 and wind noise that would be produced by a collision of the air flow β with the side view mirror 9 can be prevented or reduced. Additionally, a dynamic pressure produced by the air flow β colliding against the side view mirror 9 can be reduced to such a degree that it can substantially be ignored.

Also, with this illustrated embodiment, since the outer downward air flow guiding surface 11c passes the diverted air flow β underneath the side view mirror 9 in a laminar state, the diverted air flow β does not peel away from the outer downward air flow guiding surface 11c, undergo swirling, and become turbulent. Consequently, the diverted air flow β can be reliably prevented from becoming turbulent and colliding against the side view mirror 9 and wind noise caused by such a collision ceases to be a problem.

If the diverted air flow were to become turbulent, then the diverted air flow would cause the traveling resistance (drag) of the vehicle to increase. However, with this illustrated embodiment, as explained above, the diverted air flow β can be passed under the side view mirror 9 in a laminar state and the problem of the diverted air flow β causing the traveling resistance of the vehicle to increase does not occur.

Figure 9:
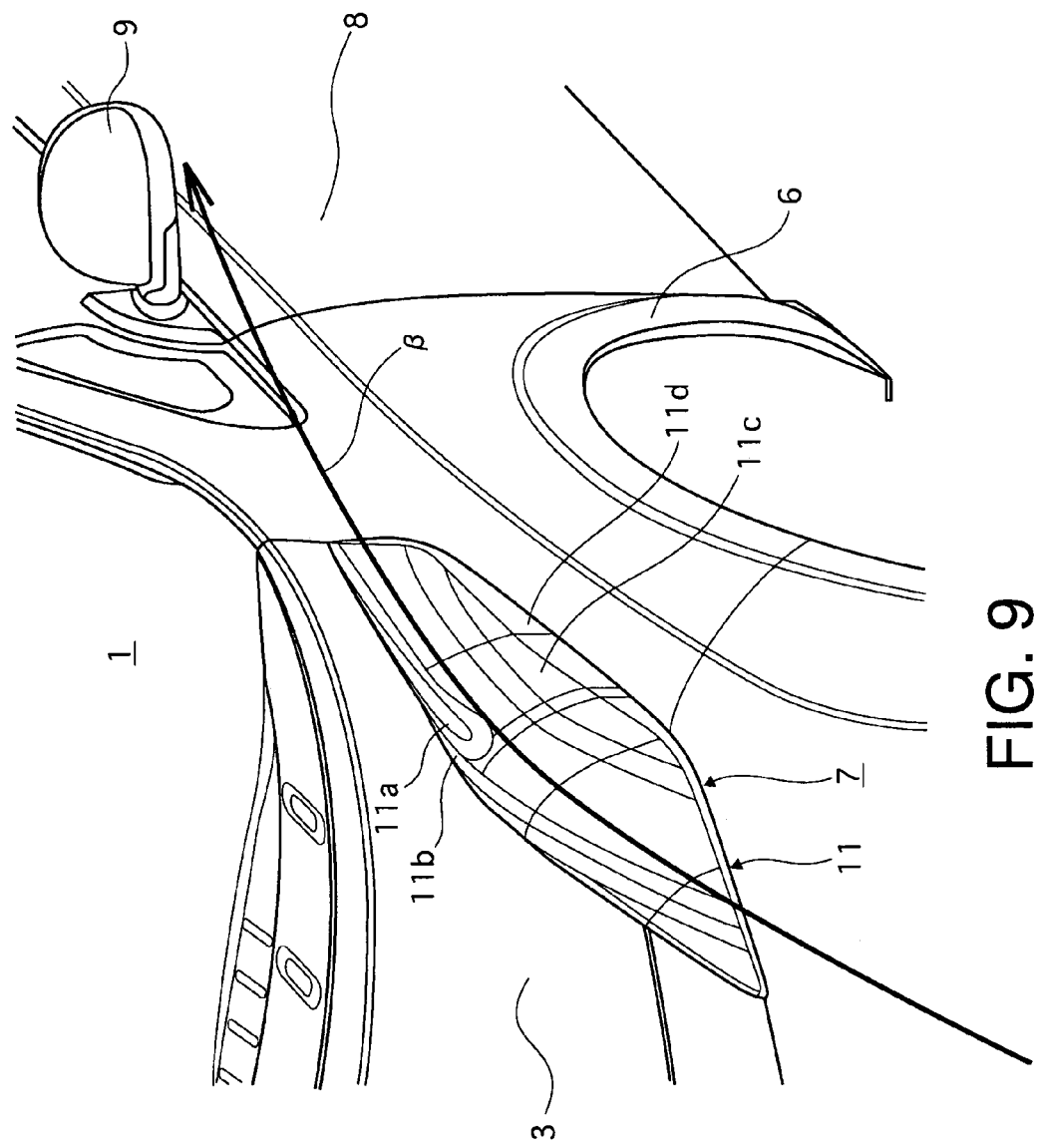
FIG. 9 is a perspective view of the left headlamp lens of the vehicle body of the vehicle shown in FIG. 1 as viewed from in front of the vehicle and depicting an air flow controlled by the widthwise surface of the left headlamp lens.

Meanwhile, as shown in FIGS. 8 and 9, the outer downward air flow guiding surface 11c is configured such that a rearmost end thereof in an air flow direction blends smoothly with the external shape of a vehicle body panel located farther rearward in the air flow direction. Consequently, the shape of the vehicle body panel located rearward of the outer downward air flow guiding surface 11c can prevent the air flow β from becoming turbulent and the aforementioned operational effects of the outer downward air flow guiding surface 11c can be ensured.

After being diverted, the laminar air flow β passes underneath the side view mirror 9. Thus, even though a side surface of the vehicle body bulges outward in a widthwise direction as the vehicle body extends in a downward direction with respect to the vehicle body, the air flow β can flow along the vehicle body side surface as shown in FIGS. 11 to 15 after passing by the side view mirror 9 due to the direction in which the air flow β passes. Consequently, the air flow β does not pass by the side view mirror 9 at a place where the air flow β would separate from the vehicle body side surface as in the case of an air flow passing above or to the outside of the side view mirror 9. Consequently, after the air flow β passes the side view mirror 9, the air flow β enjoys a lateral guiding effect provided by the vehicle body side surface and does not readily become turbulent even if it is subjected to an external force acting in a direction oriented crosswise to the air flow direction. Thus, the problem of the diverted air flow β becoming turbulent and causing the traveling resistance of the vehicle to increase does not occur.

As shown in FIG. 10, the air flow dividing ridge 11*a* in this illustrated embodiment is configured such that the maximum width Wmax between the protruding portions 11*e* and the 11*f* is equal to or larger than a vertical height of the side view mirror 9. In this way, the inner air stream α and the outer air stream β formed by the air flow dividing ridge 11*a* can be reliably separated from each other and reliably prevented from intermixing and from becoming turbulent. Additionally, the aforementioned side view mirror boundary layer air flow control, i.e., the passing of the inner air stream α along a path lying inward of the side view mirror 9 in the vehicle widthwise direction and the passing of the outer air stream β along a path lying under the side view mirror 9 as explained previously, can be accomplished more markedly.

Additionally, as shown in FIG. 10, the air flow dividing ridge 11*a* in this illustrated embodiment is configured such that a distance Ltail from a maximum width position to the downstream rearward end 11*g* is at least 1.9 times as long as the maximum width Wmax (Ltail/Wmax≥1.9). Thus, after an air flow is divided into an inner air stream α and an outer air stream β in an upstream region spanning from the upstream frontward end 11*h* of the air flow dividing ridge 11*a* to the maximum width position, the air flows α and β do not peel away from the inward longitudinal air flow guiding surface 11*b* and the outer downward air flow guiding surface 11*c* as they pass through a downstream region spanning from the maximum width position of the air flow dividing ridge 11*a* to the downstream rearward end 11*g*.

As a result, the inner air stream α and the outer air stream β remain in a laminar state when they are diverted under the guidance of the air flow guiding surfaces 11*b* and 11*c* of the air flow dividing ridge 11*a*. Moreover, when the inner air stream α and the outer air stream β are guided by the air flow guiding surfaces 11*b* and 11*c*, the inner air stream α and the outer air stream β do not become turbulent, and thus, the inner air stream α and the outer air stream β do not collide against the side view mirror 9 as a result of turbulence. As a result, the problem of the inner air stream α and the outer air stream β causing wind noise to occur and causing the traveling resistance to increase can be avoided.

Regarding achieving any of the aforementioned operational effects, in this illustrated embodiment, the operational effect can be achieved by diverting an air flow heading toward the side view mirror 9 inward of the side view mirror 9 in the vehicle widthwise direction and underneath the side view mirror 9 immediately before the air flow reaches the side view mirror 9 and by guiding the air flow after the diversion such that the air flow passes inward of the side view mirror 9 and underneath the side view mirror 9 in a laminar state. Consequently, the diversion angles by which the air flow is diverted by the inward longitudinal air flow guiding surface 11*b* and the outer downward air flow guiding surface 11*c* can be very small. Therefore, the dynamic pressure produced at the inward longitudinal air flow guiding surface 11*b* and the outer downward air flow guiding surface 11*c* is also very small.

Since the dynamic pressure at the inward longitudinal air flow guiding surface 11*b* and the outer downward air flow guiding surface 11*c* is very small and the dynamic pressure at the side view mirror 9 is very small, as explained above, a vehicle boundary layer air flow control structure according to this illustrated embodiment can achieve the operational effect of preventing or reducing wind noise caused by the side view mirror 9 while incurring substantially no increase of the vehicle traveling resistance.

With the illustrated embodiment, the following operational effect can be obtained because the bottommost edge section of the outer downward air flow guiding surface 11*c* is configured such that the bottommost edge section forms the substantially vertical upright surface 11*d*. If a downwardly sloping surface were made to encompass the bottommost edge section of the outer downward air flow guiding surface 11*c*, then the outer downward air flow guiding surface 11*c* will adjoin smoothly with the exterior surface contour of the fender 6 when viewed in a longitudinal direction of the vehicle. Consequently, a side surface air flow flowing along a side surface of the vehicle body toward the side view mirror 9 would intermix with the aforementioned outer air stream and cause turbulence, and the turbulence will collide against the side view mirror 9 and cause wind noise to occur. However, when the substantially vertical upright surface 11*d* is provided in the bottommost edge section of the outer downward air flow guiding surface 11*c* as in the illustrated embodiment, the upright surface 11*d* does not blend smoothly with the contour of the exterior surface of the fender 6 when viewed in a longitudinal direction of the vehicle. Thus, as illustrated with the air flow β in FIGS. 6 to 10, the upright wall 6 serves to prevent turbulence caused by the aforementioned intermixing. As a result, a large wind noise is prevented from occurring due to a turbulent air flow colliding with the side view mirror 9.

In the illustrated embodiment, the air flow dividing ridge 11*a*, the inward longitudinal air flow guiding surface 11*b*, the outer downward air flow guiding surface 11*c*, and the upright surface 11*d* serving to achieve the aforementioned operational effects are provided on an exterior surface of the headlamp lens 11. As a result, the aforementioned operational effects can be achieved by simply changing the shape of the headlamp lens 11 and, thus, can be achieved less expensively than if the shape of an external panel of the vehicle body is changed, which requires changing an expensive press die.

A Porsche 911 has a headlight arch section that protrudes higher than an engine hood and extends in an air flow direction. A Porsche 914 has a turn signal arch section that protrudes higher than an engine hood and extends in an air flow direction. However, wind tunnel experiment data was acquired for both of these vehicles and examined, and it was determined that in both vehicles an air flow occurring during vehicle travel directly collides with a door mirror. That is, neither the headlight arch section of the Porsche 911 nor the turn signal arch section of the Porsche 914 is configured to divert an air flow heading along an exterior contoured surface of the vehicle body toward the door mirror such that the air flow does not collide with the door mirror.

Instead of providing the air flow dividing ridge 11*a*, the inward longitudinal air flow guiding surface 11*b*, the outer downward air flow guiding surface 11c, and the upright surface 11d solely on an exterior surface of the headlamp lens 11, it is also acceptable for these constituent features to extend into an external panel of the vehicle body located at a periphery of the headlamp lens 11 or for the constituent features to be provided only on an external panel of the vehicle body instead of on an exterior surface of a headlamp lens. In short, the constituent features should be provided in a vehicle body region of an exterior contoured surface of the vehicle body where the aforementioned operational effects can be achieved most reliably and to the greatest degree.

The exterior contoured surfaces of the vehicle body surrounding the headlamp lens 11 provided with the air flow dividing ridge 11a, the inward longitudinal air flow guiding surface 11b, the outer downward air flow guiding wall 11c, and the upright surface 11d are configured such that they do not interfere with the aforementioned operational effects of the inward longitudinal air flow guiding surface 11b, the outer downward air flow guiding wall 11c, and the upright surface 11d. Furthermore, the surrounding exterior contoured surfaces of the vehicle body should preferably enhance the aforementioned operational effects of the inward longitudinal air flow guiding surface 11b, the outer downward air flow guiding wall 11c, and the upright surface 11d.

In understanding the present disclosure, as used herein to describe the above embodiment(s), the following directional terms "forward", "rearward", "upward", "downward", "vertical", "horizontal", "above", "below" "longitudinal", "widthwise", and "transverse" as well as any other similar directional terms refer to those directions of a vehicle equipped with the vehicle boundary layer air flow control structure. Accordingly, these terms, as utilized to describe the vehicle boundary layer air flow control structure should be interpreted relative to a vehicle equipped with the vehicle boundary layer air flow control structure on a flat horizontal surface. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle boundary layer air flow control structure comprising:
   a vehicle body including an exterior contoured surface with an air flow deflector; and
   a side view mirror attached to the vehicle body to provide a diagonally rearward direction to be viewed from a driver's seat;
   the air flow deflector having a downward air flow guiding surface provided in a vehicle body region of the exterior contoured surface of the vehicle body along which an air flow heading toward the side view mirror passes, the downward air flow guiding surface being spaced apart from the side mirror, the downward air flow guiding surface extending in an air flow direction of the air flow with respect to the side view mirror to divert the air flow along the exterior contoured surface of the vehicle body underneath the side view mirror.

2. The vehicle boundary layer air flow control structure of claim 1, wherein
   the downward air flow guiding surface includes a downwardly sloped section that slopes downward with respect to a vertical direction of the vehicle body as the downward air flow guiding surface extends in a downstream direction of the air flow such that the downward air flow guiding surface ultimately points underneath the side view mirror.

3. The vehicle boundary layer air flow control structure of claim 1, wherein
   the downward air flow guiding surface has a rearmost end with respect to the air flow direction that blends smoothly with an external shape of the vehicle body located farther rearward in the air flow direction than the rearmost end of the downward air flow guiding surface.

4. The vehicle boundary layer air flow control structure of claim 1, wherein
   the downward air flow guiding surface is configured and arranged with respect to the side view mirror to guide the air flow underneath the side view mirror in a laminar state after the air flow has been diverted by the downward air flow guiding surface and has departed from the downward air flow guiding surface.

5. The vehicle boundary layer air flow control structure of claim 1, wherein
   the side view mirror is a door mirror that is attached to a front side door of the vehicle body; and
   the downward air flow guiding surface has an upstream end arranged with respect to the air flow direction of the air flow at a location farther forward in a longitudinal direction of the vehicle body than a rotational center of a front wheel.

6. The vehicle boundary layer air flow control structure of claim 1, wherein
   the air flow deflector further includes an air flow dividing ridge that is configured and arranged in a vehicle widthwise direction with respect to the side view mirror to divide the air flow heading toward the side view mirror along the exterior contoured surface of the vehicle body into an inner air stream and an outer air stream that are located on widthwise inside and outside of each other such that the inner and outer air streams are separate and do not become turbulent.

7. The vehicle boundary layer air flow control structure of claim 6, wherein
   the downward air flow guiding surface is located outward with respect to the air flow dividing ridge in the vehicle widthwise direction with the downward air flow guiding surface facing outward in the vehicle widthwise direction.

8. The vehicle boundary layer air flow control structure of claim 6, wherein
   the downward air flow guiding surface includes a bottommost edge section with a substantially upright wall that forms an abrupt surface change with an adjacent section of the exterior surface of the vehicle body adjoining the downward air flow guiding surface as viewed along the vehicle longitudinal direction.

9. The vehicle boundary layer air flow control structure of claim 6, wherein
   the air flow deflector further includes an inward longitudinal air flow guiding surface located inward in the vehicle widthwise direction with respect to the air flow dividing ridge, with the inward longitudinal air flow guiding surface facing inward in the vehicle widthwise direction and being configured and arranged to divert the air flow heading toward the side view mirror inward of the side view mirror in the vehicle widthwise direction.

10. The vehicle boundary layer air flow control structure of claim 9, wherein
the inward longitudinal air flow guiding surface and the downward air flow guiding surface are configured and arranged with respect to each other such that imaginary extension planes extending from rearward edges of the inward longitudinal air flow guiding surface and the downward air flow guiding surface in a downstream direction of the air flow do not intersect each other.

11. The vehicle boundary layer air flow control structure of claim 9, wherein
the air flow deflector has a maximum width between a widthwise-inwardly protruding portion and a widthwise-outwardly protruding portion as viewed from above the vehicle body with the maximum width being equal to or larger than a vertical height of the side view mirror.

12. The vehicle boundary layer air flow control structure of claim 9, wherein
the air flow dividing ridge is provided such that an apex edge of the air flow dividing ridge is positioned inward of the side view mirror in the vehicle widthwise direction.

13. The vehicle boundary layer air flow control structure of claim 11, wherein
the air flow deflector is dimensioned such that a distance from a maximum width position where the maximum width between the widthwise-inwardly protruding portion and the widthwise-outwardly protruding portion of the air flow dividing ridge exists as viewed from above the vehicle to a downstream rearward end of the air flow dividing ridge is at least 1.9 times as long as the maximum width.

14. The vehicle boundary layer air flow control structure of claim 1, wherein
the air flow deflector is formed integrally with an exterior surface of a headlamp lens.

15. A vehicle boundary layer air flow control structure comprising:
a vehicle body including a fender having a tire wheel arch section and an exterior contoured surface with an air flow deflector; and
a side view mirror attached to the vehicle body to provide a diagonally rearward direction to be viewed from a driver's seat;
the air flow deflector having a downward air flow guiding surface provided in a vehicle body region of the exterior contoured surface of the vehicle body along which an air flow heading toward the side view mirror passes, the downward air flow guiding surface extending in an air flow direction of the air flow with respect to the side view mirror from a position frontward of a rear end portion of the tire wheel arch section to divert the air flow underneath the side view mirror.

16. The vehicle boundary layer air flow control structure of claim 15, wherein
the downward air flow guiding surface has an upstream end arranged with respect to the air flow direction of the air flow at a location farther forward in a longitudinal direction of the vehicle body than a rotational center of a front wheel, and the downstream air flow guiding surface extends in the flow direction of the air flow from the upstream end.

* * * * *